United States Patent
Muldoon et al.

(10) Patent No.: US 12,080,880 B2
(45) Date of Patent: Sep. 3, 2024

(54) NANO-ALLOY INTERPHASE FOR LITHIUM METAL SOLID STATE BATTERIES

(71) Applicant: Toyota Motor Engineering & Manufacturing North America, Inc., Plano, TX (US)

(72) Inventors: John Muldoon, Saline, MI (US); Keita Niitani, Canton, MI (US); Patrick J. Bonnick, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 195 days.

(21) Appl. No.: 16/141,609

(22) Filed: Sep. 25, 2018

(65) Prior Publication Data
US 2020/0099046 A1    Mar. 26, 2020

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/382* (2013.01); *H01M 4/405* (2013.01); *H01M 4/505* (2013.01);
(Continued)

(58) Field of Classification Search
CPC .. H01M 4/366; H01M 4/382; H01M 10/0585; H01M 10/052; H01M 4/525;
(Continued)

(56) References Cited

U.S. PATENT DOCUMENTS

| | | | |
|---|---|---|---|
| 6,537,701 B1 * | 3/2003 | Nimon | H01M 4/382 |
| | | | 429/105 |
| 9,385,397 B2 * | 7/2016 | Zhamu | H01G 11/06 |
| | (Continued) | | |

FOREIGN PATENT DOCUMENTS

| | | |
|---|---|---|
| CN | 1269243 C | 8/2006 |
| CN | 105830269 A | 8/2016 |
| | (Continued) | |

OTHER PUBLICATIONS

Liao et al., Developing a "Water-Defendable" and "Dendrite-Free" Lithium-Metal Anode Using a Simple and Promising GeCl4 Pretreatment Method, Advanced Materials, 2018, 30, 1705711, pp. 1-8. (Year: 2018).*

(Continued)

*Primary Examiner* — Christian Roldan
(74) *Attorney, Agent, or Firm* — Oblon, McClelland, Maier & Neustadt, L.L.P.

(57) ABSTRACT

An electrode for a solid-state lithium battery is provided. The electrode has a current collector and an electrode active layer of lithium metal or lithium metal alloy on the current collector. A surface layer of a homogeneous nano-alloy particle composition containing nanoparticles of an element M or nanoparticles of a lithium alloy of an element M, wherein M is at least one element selected from elements of Groups 2 and 8-16 is present on the active layer. Solid-state batteries containing the electrode are provided.

7 Claims, 5 Drawing Sheets

(51) Int. Cl.
| | | |
|---|---|---|
| *H01M 4/40* | (2006.01) | |
| *H01M 4/505* | (2010.01) | |
| *H01M 4/525* | (2010.01) | |
| *H01M 4/58* | (2010.01) | |
| *H01M 10/052* | (2010.01) | |
| *H01M 10/0562* | (2010.01) | |
| *H01M 10/0585* | (2010.01) | |

(52) U.S. Cl.
CPC ......... *H01M 4/525* (2013.01); *H01M 4/5825* (2013.01); *H01M 10/052* (2013.01); *H01M 10/0562* (2013.01); *H01M 10/0585* (2013.01); *H01M 2300/0068* (2013.01)

(58) Field of Classification Search
CPC .... H01M 4/405; H01M 4/505; H01M 4/5825; H01M 10/0562; H01M 2300/0068
USPC ......................................................... 429/323
See application file for complete search history.

(56) References Cited

U.S. PATENT DOCUMENTS

| | | | | |
|---|---|---|---|---|
| 10,256,448 | B2* | 4/2019 | Cui | H01M 4/1395 |
| 10,629,947 | B2* | 4/2020 | Affinito | H01M 4/405 |
| 11,545,660 | B2* | 1/2023 | Song | H01M 10/4235 |
| 11,552,290 | B2* | 1/2023 | Chakraborty | H01M 10/48 |
| 2003/0129497 | A1* | 7/2003 | Yamamoto | H01M 4/387 429/246 |
| 2009/0042099 | A1* | 2/2009 | Tatematsu | H01M 2/1083 429/210 |
| 2009/0092887 | A1 | 4/2009 | McGrath et al. | |
| 2010/0156353 | A1 | 6/2010 | Iyer et al. | |
| 2011/0159376 | A1* | 6/2011 | Skotheim | H01M 4/385 429/303 |
| 2013/0288130 | A1 | 10/2013 | Sheem et al. | |
| 2014/0220439 | A1* | 8/2014 | Badding | H01M 4/381 429/216 |
| 2014/0272524 | A1 | 9/2014 | Visco et al. | |
| 2016/0351952 | A1* | 12/2016 | Ohtomo | H01M 10/0562 |
| 2017/0028476 | A1 | 2/2017 | Kovalenko et al. | |
| 2017/0346099 | A1* | 11/2017 | Choi | H01M 4/382 |
| 2018/0097229 | A1 | 4/2018 | Jo et al. | |
| 2019/0140260 | A1* | 5/2019 | Nazar | H01M 4/0402 |
| 2020/0185726 | A1* | 6/2020 | Kubota | H01M 4/13 |

FOREIGN PATENT DOCUMENTS

| | | | |
|---|---|---|---|
| CN | 106816578 A | 6/2017 | |
| CN | 107732198 A | 2/2018 | |
| JP | 6-84512 | 3/1994 | |
| JP | 2006244984 A * | 9/2006 | B01J 21/08 |
| JP | 2018-26199 | 2/2018 | |
| JP | 2018-129159 | 8/2018 | |

OTHER PUBLICATIONS

Luo et al., Reducing Interfacial Resistance between Garnet-Structured Solid-State Electrolyte and Li Metal Anode by a Germanium Layer, Advanced Materials, 2017, 29, 1606042, pp. 1-7. (Year: 2017).*

International Search Report and Written Opinion of the International Searching Authority issued on Jan. 30, 2020 in PCT/US19/52379, citing documents AA-AB and AO therein, 18 pages.

Li et al., "Nano-alloy anode for lithium ion batteries", Solid State Ionics 148:247-258 (2002).

Shi et al., "Electrochemical properties of Li—Mg alloy electrodes for lithium batteries", Journal of Power Sources 92:70-80 (2001).

European Search Report issued May 23, 2022, in corresponding European Patent Application No. 19864230.

Mukul D. Tikekar, et al., "Design Principles for Electrolytes and Interfaces for Stable Lithium-Metal Batteries", *Nature Energy*, vol. 1, pp. 1-7, Sep. 2016.

Luis E. Camacho-Forero, et al., "Exploring Interfacial Stability of Solid-State Electroyltes at the Lithium-Metal Anode Surface," *Journal of Power Sources*, vol. 396 (2018), pp. 782-790.

Xiaohui Zhao et al., "Lithium/Sulfur Secondary Batteries: A Review", *J. Electrochem. Sci. Technol.* (2016) 7(2), pp. 97-114.

Office Action issued May 23, 2023, in corresponding Japanese Patent Application No. 2021-515640.

He et al., "Formation of self-limited, stable and conductive interfaces between garnet electrolytes and lithium anodes for reversible lithium cycling in solid-state batteries", Journal of Materials Chemistry A, 2018, vol. 6, pp. 11463-11470.

Zhong et al., "Conformation of lithium-aluminium alloy interphase-layer on lithium metal anode used for solid state batteries", Electrochimica Acta, 2018, vol. 277, pp. 268-275.

Algül, "Development of Increased Corrosion Resistance Anode Materials for Lithium Air Batteries", PQDT-Global, 2015, 21 pages (with English summary).

* cited by examiner

NANO-ALLOY INTERPHASE FOR LITHIUM METAL SOLID STATE BATTERIES

FIELD OF THE DISCLOSURE

This disclosure is directed to a solid-state lithium battery having a lithium metal or lithium alloy anode and a solid-state electrolyte wherein an interphase region of lithium nano-alloy is located between the anode and the electrolyte.

BACKGROUND

The ubiquitous Li-ion battery has become an integral part of society, which enabled the revolution of portable electronic devices, notably cell phones and laptops. The next epoch will be the integration of batteries into the transportation and grid storage industries, further intensifying society's dependence on batteries. State-of-the-art Li-ion cells utilize a liquid electrolyte consisting of lithium hexafluorophosphate salt dissolved in carbonate-based organic solvents. Recently it has become more evident that inorganic solid electrolytes are a superior alternative to liquid electrolytes which are flammable and present environmental issues.

Replacing the flammable organic liquid electrolyte with a solid Li-ion conductive phase would alleviate this safety issue, and may provide additional advantages such as improved mechanical and thermal stability. A primary function of the solid Li-ion conductive phase, usually called solid Li-ion conductor or solid-state electrolyte, is to conduct Li-ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and shorts the battery energy is rapidly released and may initiate ignition of the organic solvent of the nonaqueous electrolyte.

Therefore, there is much interest and effort focused on the discovery of new solid Li-ion conducting materials which would lead to an all solid-state lithium battery. Studies in the past decades have focused mainly on ionically conducting oxides such as LISICON ($Li_{14}ZnGe_4O_{16}$), NASICON ($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (e.g. $Li_{2.88}PO_{3.73}N_{0.14}$) and sulfides, such as $Li_3PS_4$, $Li_7P_3S_{11}$ and LGPS ($Li_{10}GeP_2S_{12}$).

Batteries using a lithium metal negative electrode may be of the greatest interest in battery research and development because lithium metal has an extremely high specific capacity of 3,860 mAh/g and a low reduction potential of −3.04 V vs the standard hydrogen electrode. However, due to such low reduction potential, most materials are reduced when they are exposed to lithium metal. For instance, when exposed to air (i.e. $H_2O$, $CO_2$, $N_2$ and O2) lithium metal is immediately compromised by a layer of lithium salts on the surface, such as $Li_2CO_3$, $Li_3N$, LiOH and $Li_2O$. Lithium metal exposed to liquid electrolytes (e.g. carbonates) form layers containing a mixture of organic and inorganic species. Solid electrolytes are little better and most react with lithium to form salts comprised of lithium and the other elements that make up the solid electrolyte.

For example, lithium thiophosphate solid electrolytes in contact with lithium decompose into $Li_2S$ and $Li_3P$ [R Garcia-Mendez, F Mizuno, R Zhang, T S Arthur, J Sakamoto, Electrochimica Acta, vol 237, pg. 144-151 (2017)]. When in contact with Li metal, phosphorous within lithium thiophosphates are reduced as follows (J. Mater. Chem. A, 2016, 4, 3253-3266).

$$Li_3PS_4 + 5Li \rightarrow P + 4Li_2S$$

$$P + 3Li \rightarrow Li_3P$$

Similarly, $Li_{10}GeP_2S_{12}$ has also been reported to undergo degradation when in contact with lithium metal as follows (J. Mater. Chem. A, 2016, 4, 3253-3266):

$$Li_{10}GeP_2S_{12} + 10Li \rightarrow 2P + 8Li_2S + Li_4GeS_4$$

$$P + 3Li \rightarrow Li_3P$$

$$4Li_4GeS_4 + 31Li \rightarrow 16Li_2S + Li_{15}Ge_4$$

$Li_{10}GeP_2S_{12}$ both $Ge^{4+}$ and $P^{5+}$ are reduced as indicated.

In another example, $Li_7La_3Zr_2O_{12}$, which contains secondary cations $La^{3+}$ and $Zr^{4+}$ undergoes chemical degradation when in contact with lithium metal according to the following chemistry (J. Mater. Chem. A, 2016, 4, 3253-3266):

$$6Li_7La_3Zr_2O_{12} + 40Li \rightarrow 4Zr_3O + 41Li_2O + 9La_2O_3$$

$$Zr_3O + 2Li \rightarrow Li_2O + 3Zr$$

$$La_2O_3 + 6Li \rightarrow 2La + 3Li_2O$$

As exemplified, solid Li-ion conductors suffer a stability issue when in direct contact with a Li metal anode. In each of these cases, the non-uniformity of the decomposition products and, in many cases, highly resistive nature of many such products result in a non-uniform current distribution across the lithium electrode surface during lithium deposition, which leads to uneven plating and dendrite formation.

Of the solid electrolyte systems being investigated, lithium thiophosphates tend to provide better ionic conductivity and malleability. The structural characteristics of effective $Li^+$ conducting crystal lattices have been described by Ceder et al. (Nature Materials, 14, 2015, 1026-1031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^+$ ion hopping across adjacent tetrahedral coordinated $Li^+$ lattice sites was indicated to offer a path of lowest activation energy. The most notable examples of lithium thiophosphate solid electrolytes include $Li_3PS_4$, $Li_7P_3S_{11}$ and $Li_{10}GeP_2S_{12}$. Thermally stable solid-state electrolytes allow for a paradigm shift in battery pack design by simplifying thermal management and allowing bipolar stacking, thereby dramatically improving the energy density beyond what would be possible for a Li-ion battery containing liquid electrolyte.

Thus, there is a need to discover a protective means which stabilizes a solid electrolyte from reduction by a lithium metal electrode and allows for the development of batteries which utilize the full specific capacity of the lithium metal anode. Specifically, there is a need to discover a protective means which stabilizes lithium thiophosphate solid electrolytes to reduction by a lithium metal electrode.

Accordingly, an object of this application is to provide a protective structure on a lithium metal electrode which protects an adjacent solid-state electrolyte from reductive decomposition.

Another object is to provide a method to prepare such structure.

Another object is to provide an all-solid state lithium battery containing a lithium metal anode and a solid state electrolyte.

Another object is to provide an all-solid state lithium battery containing a lithium metal anode and a lithium thiophosphate solid state electrolyte.

SUMMARY OF THE EMBODIMENTS

These and other objects are provided by the embodiments of the present disclosure, the first embodiment of which includes an electrode for a solid-state lithium battery, comprising:

a current collector; and an electrode active layer on the current collector;

wherein the electrode active layer comprises lithium metal or a lithium metal alloy having a surface layer of a homogeneous nano-alloy particle composition containing nanoparticles of an element M or nanoparticles of a lithium alloy of an element M, wherein M is at least one element selected from elements of Groups 2 and 8-16.

In an aspect of the first embodiment, a thickness of the surface layer of nanoparticle composition is from 1 to 100 nm.

In a second embodiment, the present disclosure includes a solid-state lithium battery, comprising: at least one electrode for a solid-state lithium battery according to the first embodiment and all aspect thereof; and a solid-state electrolyte in direct contact with the surface layer of a homogeneous nano-alloy particle composition.

In a third embodiment, the present disclosure includes a solid-state lithium battery, comprising: a lithium metal or lithium alloy metal anode; a solid-state electrolyte; and a cathode; wherein an interphase region of at least one of LiM alloy nanoparticles and M element nanoparticles is uniformly arranged between the anode metal and the solid-state electrolyte and wherein the alloy component M is an element capable to alloy with lithium selected from elements of Groups 2 and 8-16.

In another aspect of the third embodiment, the solid-state electrolyte is a lithium thiophosphate selected from the group consisting of a lithium thiophosphate composite of formula (I), $Li_3PS_4$, $Li_7P_3S_{11}$ and $Li_{10}GeP_2S_{12}$:

$$xLi_2S \cdot yP_2S_5 \cdot (100-x-y)B \quad (I)$$

wherein B is a composite material selected from the group of materials including $Li_3N$, $P_2O_5$ $Li_2O$, $LiN_3$, $GeS_2$ or LiX wherein X is I, Cl or Br, each of x and y represent a mass % value of from 33.3% to 50% such that the total mass % of $Li_2S$, $P_2S_5$ and B is 100%.

In a further selection of the previous aspect the lithium thiophosphate comprises a lithium salt selected from the group of salts consisting of LiI, LiBr, LiCl, $Li_3N$, $Li_3P$, $Li_2O$, $Li_3BO_3$, and $LiBH_4$.

In another aspect of the third embodiment, the cathode comprises a lithium metal oxide selected from the group consisting of lithium cobalt oxide ($LiCoO_2$), lithium manganese oxide ($LiMn_2O_4$), lithium iron phosphate ($LiFePO_4$) and lithium nickel manganese cobalt oxide.

In another aspect of the third embodiment, the cathode comprises elemental sulfur, selenium, tellurium or a mixture of two or more of these.

The foregoing paragraphs have been provided by way of general introduction, and are not intended to limit the scope of the following claims. The described embodiments, together with further advantages, will be best understood by reference to the following detailed description taken in conjunction with the accompanying drawings.

DESCRIPTION OF THE PREFERRED EMBODIMENTS

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently. The term "approximately" when associated with a numerical value conveys a range from −10/o of the base value to +10% of the base value.

As used herein, the words "a" and "an" and the like carry the meaning of "one or more." The phrases "selected from the group consisting of," "chosen from," and the like include mixtures of the specified materials. Terms such as "contain (s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

In consideration of the electrolyte reductive decomposition when in contact with lithium metal described previously, the inventors have surprisingly discovered that by introducing a uniform, nano-alloy interphase region between the lithium metal and a solid electrolyte, the decomposition of the solid electrolyte is reduced, the stripping and plating of lithium metal is enhanced and dendritic growth is impeded. Therefore, the cycle life of the lithium metal anode is enhanced.

The surprising improvement in performance is demonstrated in Example 4 and FIGS. 5-8 wherein the long-term cycling performance of batteries containing nano-alloy interphases according to embodiments of the present disclosure was shown to be significantly more stable than batteries containing "bare" lithium electrodes.

Figure 4:
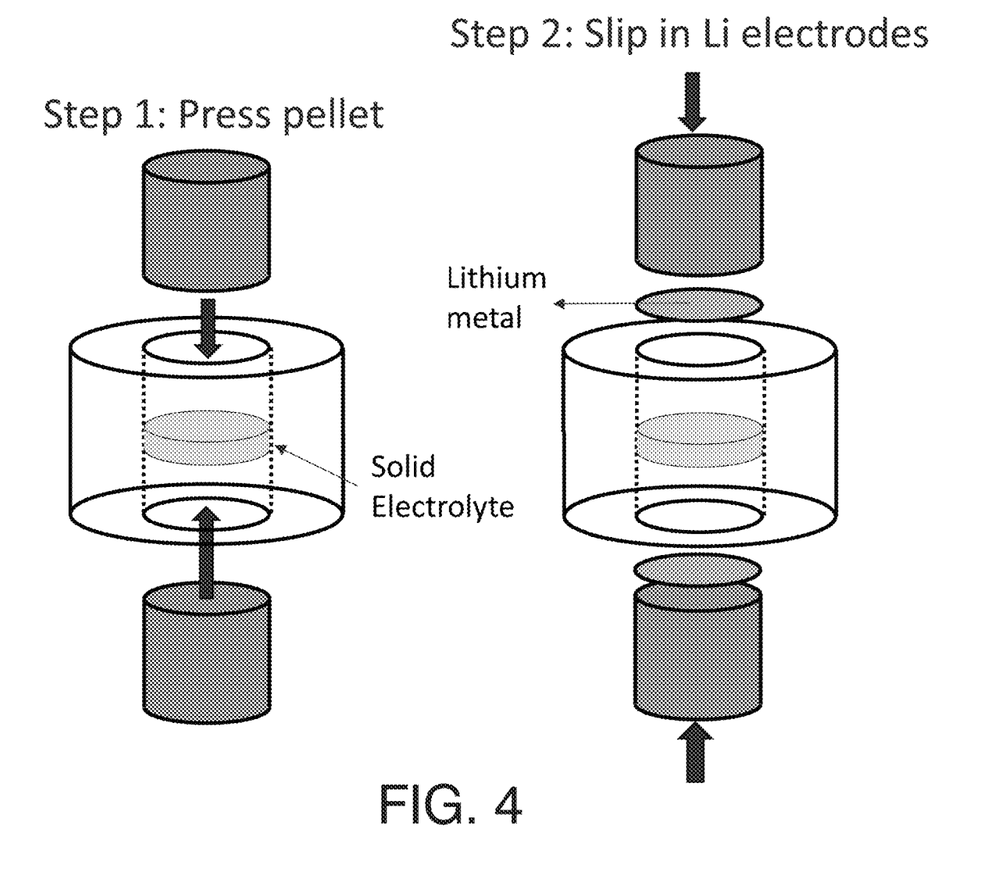
FIG. 4 shows a symmetric cell design and assembly for testing nano-alloy interphases on lithium metal.

Nano-alloy interphases on lithium metal were mainly tested by galvanostatically cycling symmetric lithium cells where lithium metal was used as both the positive and negative electrodes. FIG. 4 shows a schematic of the symmetric cell design and assembly. First, the solid electrolyte powder was pressed into a pellet. Then the pistons were removed and lithium disks were slipped into the cell on both sides of the pellet. The pistons were replaced and light pressure applied to them. A conditioning cycle at a low rate (10 $\mu A/cm^2$) was performed on fresh cells to ensure the nano-alloy was fully lithiated before they were cycled. In general, a stable overpotential during electrode cycling is desirable since it is indicative of a stable interphase between the lithium metal and the solid electrolyte. When lithium thiophosphate solid electrolyte is in direct contact with lithium, $Li_3P$, $Li_2S$ and possibly other lithium salts (e.g. lithium halides, lithium nitrates, etc. . . . depending on the blend of lithium thiophosphate used) are formed, which can increase the cell resistance and, correspondingly, the overpotential during plating and stripping. [Garcia-Mendez et al., DOI: 10.1016/j.electacta.2017.03.200] Additionally, lithium metal can grow through solid electrolytes, which decreases the cell resistance. The cell resistance eventually reaches zero when the lithium growths connect both electrodes and short circuit the cell. FIGS. 5-8 compare the cycling behavior of native interphases (FIGS. 5 and 7) to nano-alloy interphases (FIGS. 6 and 8), where the lithium metal was dipped in a solution to intentionally create an interphase that would not normally form between lithium thiophosphate and lithium metal.

Figure 5:
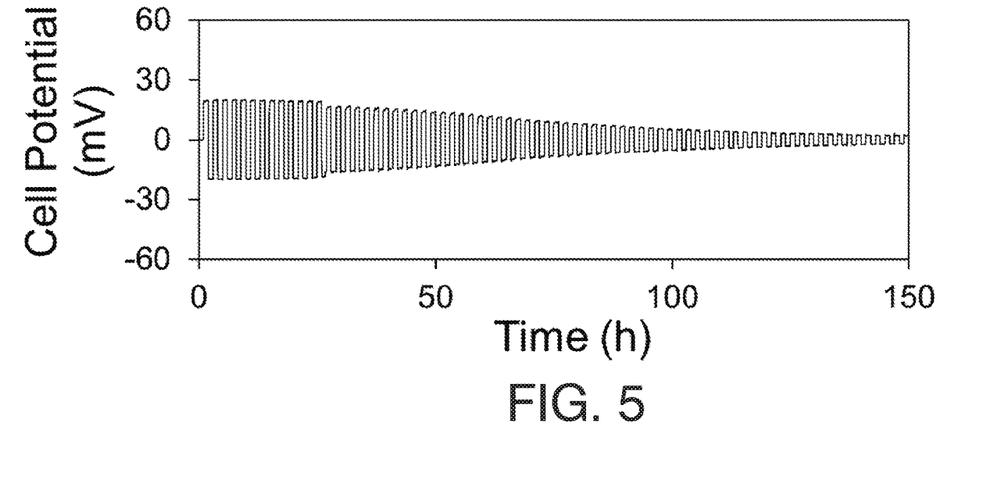
FIG. 5 shows the cycling performance of a Li/$Li_3PS_4$/Li cell at 25° C., 0.1 mA/cm$^2$ with 1-hour half-cycles.

As shown in FIG. 5 in a cell containing untreated lithium metal electrodes (no nano-alloy interphase present) the stripping and plating potentials gradually decline throughout cycling at 25° C., 0.1 $mA/cm^2$ with 1-hour half-cycles indicating that lithium slowly penetrates the solid electrolyte, reducing the cell resistance. This is considered a result of the non-uniformity of the decomposition products and, in many cases, highly resistive nature of many such products which results in a non-uniform current distribution across the lithium electrode surface during lithium deposition, which leads to uneven plating and dendrite formation.

Figure 6:
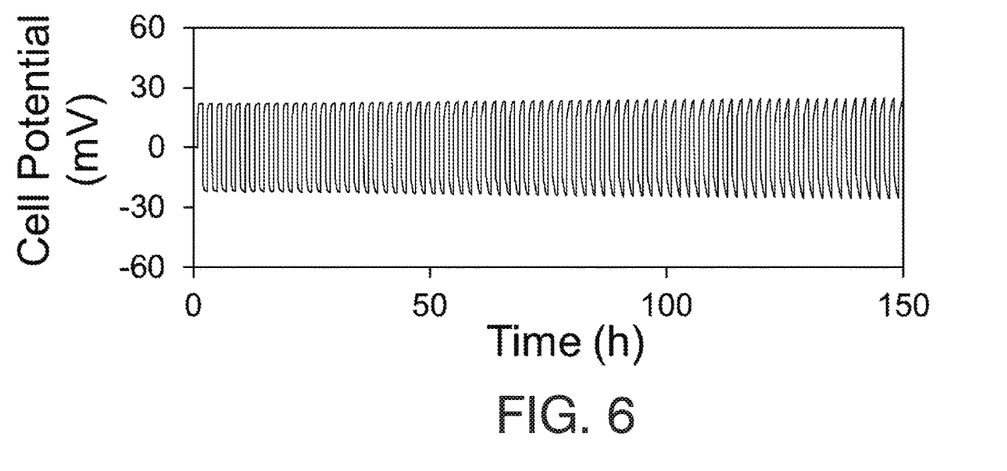
FIG. 6 shows the cycling performance of a Li($InI_3$)/$Li_3PS_4$/($InI_3$)Li cell at 25° C., 0.1 mA/cm$^2$ with 1-hour half-cycles.

In comparison, as shown in FIG. 6, during long term cycling under the same conditions in a cell containing nano-alloy interphase protected lithium metal the average stripping and plating potentials remained constant throughout cycling, indicating that the nano-alloy interphase is stable and protects the solid electrolyte from reacting with the lithium metal.

Figure 7:
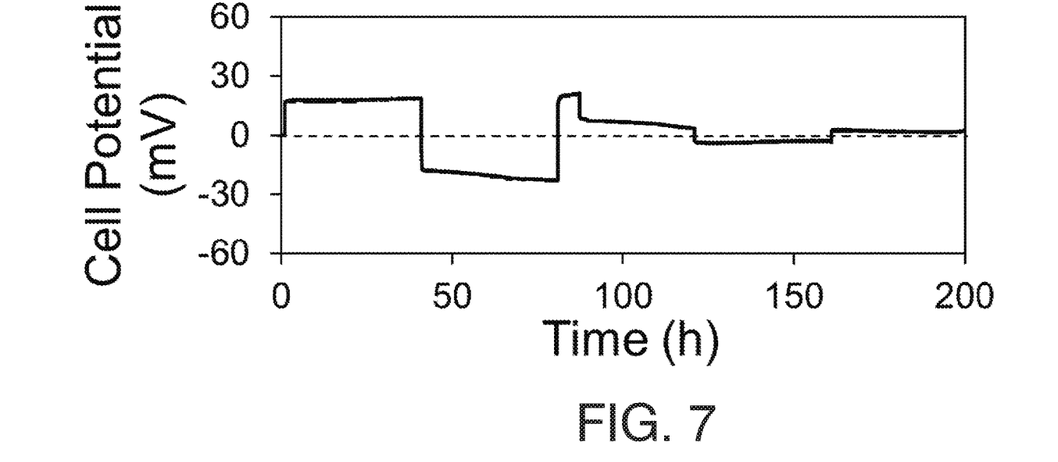
FIG. 7 shows the cycling performance of a Li/$Li_3PS_4$/Li cell at 25° C., 0.1 mA/cm$^2$ with 40-hour half-cycles.

FIG. 7 shows the cycling of a Li—Li symmetric cell using lithium thiophosphate solid electrolyte and untreated lithium metal electrodes (not protected with a nano-alloy interphase) prior to testing. The stripping and plating overpotentials are not stable through cycling at 25° C., 0.1 $mA/cm^2$ with 40 hour half-cycles, and a short-circuit develops, similar to reports from the literature [Garcia-Mendez et al., DOI: 10.1016/j.electacta.2017.03.200].

Figure 8:
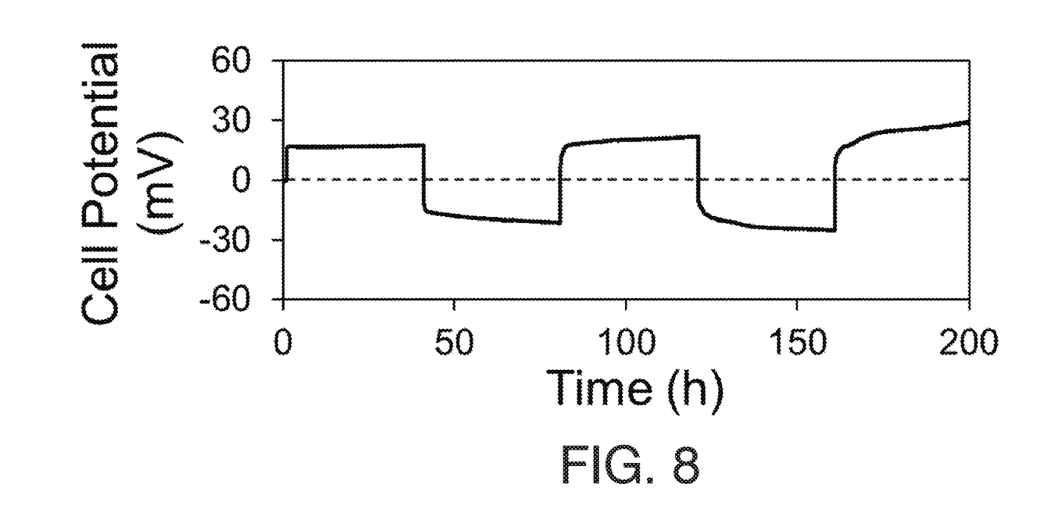
FIG. 8 shows the cycling performance of a Li($In_3$)/$Li_3PS_4$/($InI_3$)Li cell at 25° C., 0.1 mA/cm$^2$ with 40-hour half-cycles.

In comparison to FIG. 7, FIG. 8 shows the cycling of a Li—Li symmetric cell using lithium thiophosphate solid electrolyte. The lithium metal electrodes were treated with indium iodide in dimethyl ether solvent prior to testing. The stripping and plating potentials are more stable through cycling, suggesting a stable nano-alloy interphase.

Thus the present disclosure provides an electrode for a solid-state lithium battery, comprising: a current collector, and an electrode active layer on the current collector; wherein the electrode active layer comprises lithium metal or a lithium metal alloy having a surface layer of a nano-alloy particle composition containing nanoparticles of an element M or a lithium alloy of an element M wherein M is at least one element selected from elements of Groups 2 and 8-16.

The nano-alloy surface layer may be prepared by exposing a lithium metal electrode surface to a non-aqueous solution of salt of a metal M. The lithium electrode may be dipped in the non-aqueous M solution or the solution applied to a surface of the lithium electrode by spraying or by a method such as ink-jet application. The nano-alloy interphase is created when the metal of the salt is reduced by the lithium and deposits in the form of nanoparticles on the lithium surface. The metal, M, may be any element from Groups 2 and 8-16 that readily alloys with lithium metal such as, but not limited to: Ag, Al, As, Bi, Ca, Cd, Ga, Ge, In, Mg, N, Pb, Pd, Pt, Rh, Ru, S, Sb, Se, Si, Sn, Sr, Te, Tl, Zn. The salt, X, may be any anion, such as, but not limited to, iodide, bromide, chloride, bis(trifluoromethanesulfonyl) imide ($TFSI^-$), hexafluorophosphate ($PF_6^-$), nitrate ($NO_3^-$), bis(trimethylsilyl)amide ($HMDS^-$), etc.

The concentration of the MX salt in the non-aqueous solution may be from 0.1 to 50 mmol/L and the time of exposure of the salt solution to the lithium metal or alloy may be from 1 to 600 seconds. Generally, the temperature of the solution may be from 20 to 30° C. The thickness of the nano-alloy particle layer obtained is determined by the concentration of the MX salt in the solution and the time and temperature of the surface exposure. The thickness of the nano-alloy layer is not limited, but generally, may vary from 1 to 100 nm, preferably, 5 to 50 nm and most preferably 10-25 nm.

Alternatively, the nano-alloy interphase could be formed through chemical or physical vapor deposition (CVD or PVD) by depositing (such as by sputtering or ALD) any lithium-alloying element(s) onto lithium metal.

The nano-alloy surface layer is homogeneous in composition meaning that the nano alloy particles are evenly and equally distributed across the lithium metal surface. Thus the nano-alloy surface layer is uniform in composition and concentration of nanoparticles.

In a second embodiment, the present disclosure provides a solid-state lithium battery, comprising: at least one electrode for a solid-state lithium battery according to the first embodiment; and a solid-state electrolyte in direct contact with the surface layer of a homogeneous nano-alloy particle composition.

In a third embodiment, the present disclosure provides a solid-state lithium battery, comprising: a lithium metal or lithium alloy metal anode; a solid-state electrolyte; and a cathode; wherein an interphase region of at least one of LiM alloy nanoparticles and M element nanoparticles is uniformly arranged between the anode metal and the solid-state electrolyte and wherein the alloy component M is an element capable to alloy with lithium selected from elements of Groups 2 and 8-16.

The metal, M, may be any element from Groups 2 and 8-16 that readily alloys with lithium metal such as, but not limited to: Ag, Al, As, Bi, Ca, Cd, Ga, Ge, In, Mg, N, Pb, Pd, Pt, Rh, Ru, S, Sb, Se, Si, Sn, Sr, Te, Tl, Zn. The thickness of the inter-phase region is not limited, but generally, may vary from 1 to 100 nm, preferably, 5 to 50 nm and most preferably 10-25 nm.

The solid electrolyte may be of any composition known in the art and may be any previously described. In a preferred aspect of the third embodiment, the electrolyte may be a lithium thiophosphate composite of formula (I):

$x\text{Li}_2\text{S}\cdot y\text{P}_2\text{S}_5\cdot(100-x-y)\text{B}$ wherein B is a composite material selected from the group of materials including $\text{Li}_3\text{N}$, $\text{P}_2\text{O}_5$ $\text{Li}_2\text{O}$, $\text{LiN}_3$, $\text{GeS}_2$ or LiX wherein X is 1, Cl or Br, each of x and y represent a mass % value of from 33.3% to 50% such that the total mass % of $\text{Li}_2\text{S}$, $\text{P}_2\text{S}_5$ and B is 100%. Lithium thiophosphate compounds of interest also include $\text{Li}_3\text{PS}_4$, $\text{Li}_7\text{P}_3\text{S}_{11}$ and $\text{Li}_{10}\text{GeP}_2\text{S}_{12}$. Synthesis of such composite materials is described in U.S. application Ser. No. 16/043,944, filed Jul. 24, 2018, the disclosure of which is incorporated herein by reference.

Additionally, the lithium thiophosphate may be doped with lithium salts such as LiI, LiBr, LiCl, $\text{Li}_3\text{N}$, $\text{Li}_3\text{P}$, LiPON, $\text{Li}_2\text{O}$, $\text{Li}_3\text{BO}_3$, or $\text{LiBH}_4$.

The cathode may be any conventionally employed in lithium ion batteries, including but not limited to composite lithium metal oxides such as, for example, lithium cobalt oxide ($\text{LiCoO}_2$), lithium manganese oxide ($\text{LiMn}_2\text{O}_4$), lithium iron phosphate ($\text{LiFePO}_4$) and lithium nickel manganese cobalt oxide. Other active cathode materials may also include elemental sulfur, other chalcogenides, such as selenium and tellurium and metal sulfide composites. The cathode may be constructed according to methods conventionally known in the art and may include conductive carbon and a binder. The cathode may also include a current collector such as copper, aluminum and stainless steel.

In one aspect, the active cathode material may be a transition metal, preferably, silver or copper. A cathode based on such transition metal may not include a current collector.

EXAMPLES

Example 1

Figure 1:
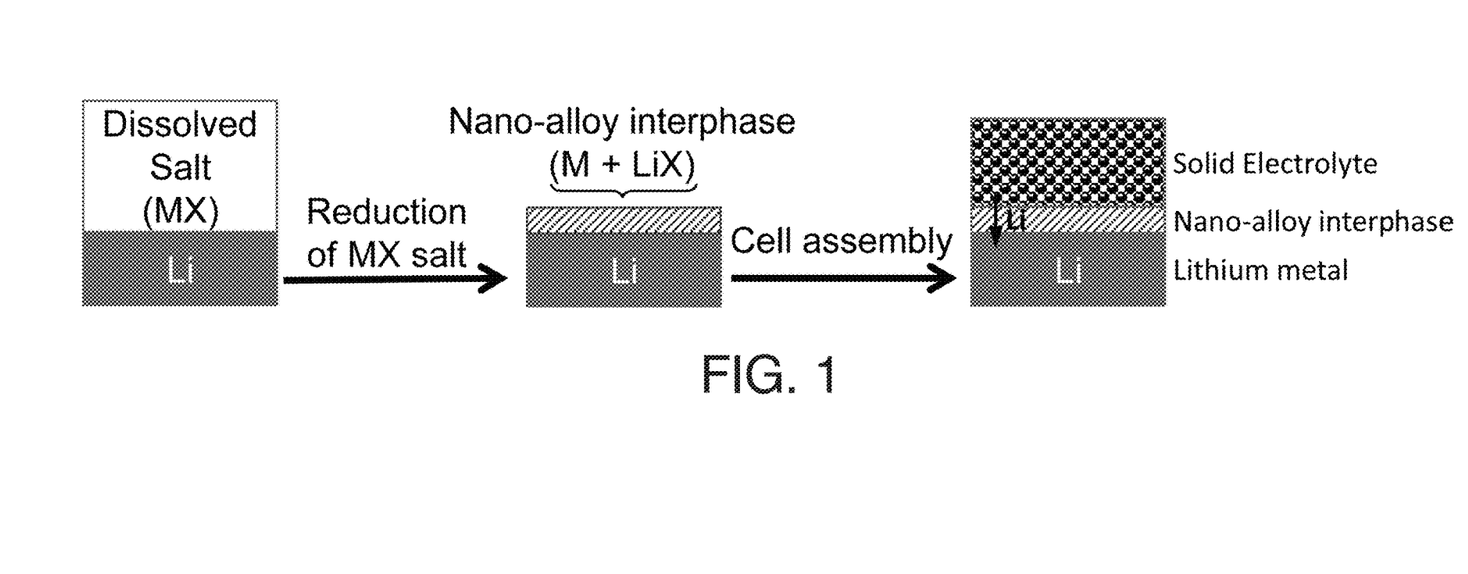
FIG. 1 shows a schematic diagram of the formation of a nano-alloy interphase layer according to an embodiment of this disclosure and incorporation of the interphase layer in a solid-state lithium battery.
Figure 2:
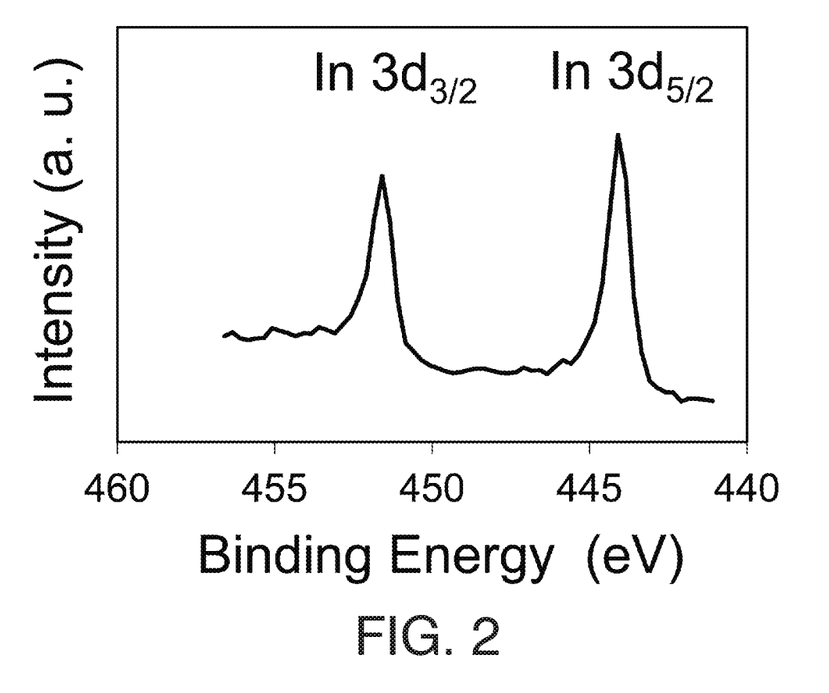
FIG. 2 shows an XPS analysis of a nano-alloy interphase obtained by contacting lithium foil with a solution of $InI_3$.

Lithium metal was dipped into a solution of 50 mmol/L indium iodide in dimethyl ether (DME) for 600 seconds. X-ray photoelectron spectroscopy (XPS) analysis, as shown in FIG. 2, demonstrated the presence of elemental (metallic) indium on the lithium metal surface based on the presence of asymmetrical peaks at 451.6 eV and 444.1 eV.

Example 2

Lithium metal was dipped into 50 mmol/L indium iodide in 1,3 dioxolane for 600 seconds. XPS analysis was similar to that of FIG. 2.

Example 3

Figure 3:
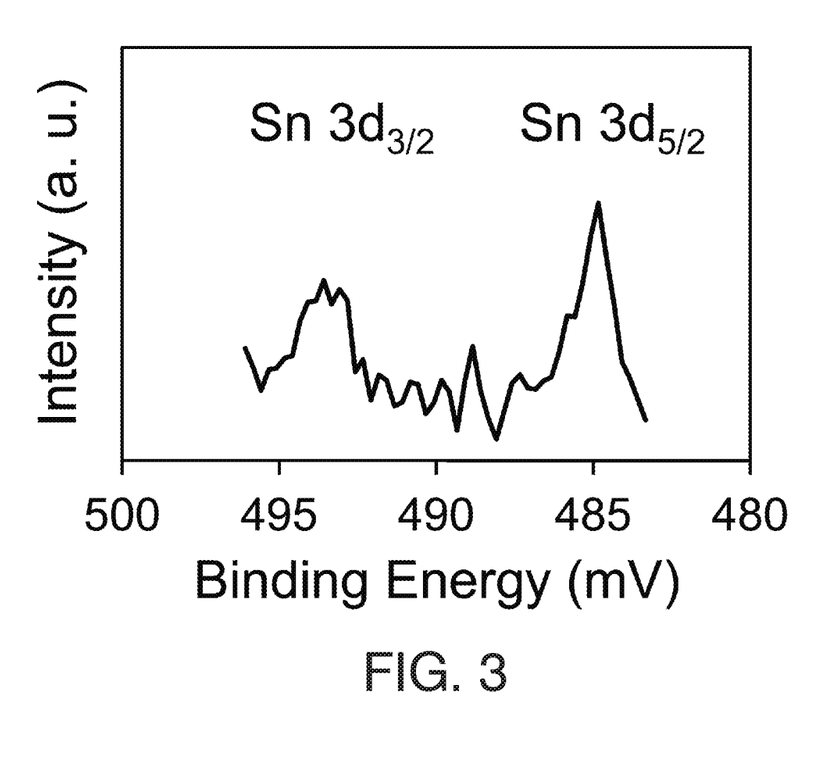
FIG. 3 shows an XPS analysis of a nano-alloy interphase obtained by contacting lithium foil with a solution of $Sn(TFSI)_2$.

Lithium metal was dipped into 50 mmol/L tin bis(trifluoromethanesulfonyl)-imide (TFSI) in dimethyl sulfoxide for 600 seconds. As shown in FIG. 3, XPS analysis of the surface of lithium metal after contact with tin salts reveals the presence of elemental tin, based on the peaks located at about 493.6 eV and 484.8 eV.

Example 4

Symmetric lithium/solid electrolyte/lithium cells were fabricated by pressing the lithium onto either side of a solid electrolyte pellet with or without heat. A typical procedure would involve two steps: (1) pressing solid electrolyte powder into a pellet, (2) spreading or applying the anode material to each side of the solid electrolyte and pressing the stack a second time. This method is schematically shown in FIG. 4. First, 300 mg of lithium thiophosphate was cold-pressed into a 1.128 cm diameter pellet using 10 tons of pressure. Lithium metal disks were gently pressed against both sides of the solid electrolyte pellet to complete the symmetric cell.

FIG. 5 shows the long-term cycling at 25° C., 0.1 mA/cm$^2$ with 1-hour half-cycles, of a Li—Li symmetric cell using lithium thiophosphate solid electrolyte. The lithium metal electrodes were untreated prior to testing (i.e. bare lithium metal). The stripping and plating potentials gradually declined throughout cycling, indicating that lithium slowly penetrated the solid electrolyte, reducing the cell resistance.

FIG. 6 shows the long-term cycling at 25° C., 0.1 mA/cm$^2$ with 1-hour half-cycles, of a Li—Li symmetric cell using lithium thiophosphate solid electrolyte. The lithium metal electrodes were treated with indium iodide in 1,2 dimethoxyethane solvent prior to testing (i.e. nano-alloy interphase protected lithium metal). The average stripping and plating potentials remained constant throughout cycling, indicating that the nano-alloy interphase is stable and protects the solid electrolyte from reacting with the lithium metal.

FIG. 7 shows the cycling at 25° C., 0.1 mA/cm$^2$ with 40-hour half-cycles, of a Li—Li symmetric cell using lithium thiophosphate solid electrolyte. The lithium metal electrodes were not protected with a nano-alloy interphase prior to testing. The stripping and plating overpotentials were not stable through cycling and a short-circuit developed, similar to reports from the literature [Garcia-Mendez et al., DOI: 10.1016/j.electacta.2017.03.200].

FIG. 8 shows the cycling at 25° C., 0.1 mA/cm$^2$ with 40-hour half-cycles, of a Li—Li symmetric cell using lithium thiophosphate solid electrolyte. The lithium metal electrodes were treated with indium iodide in dimethyl ether solvent prior to testing. The stripping and plating potentials were more stable through cycling, suggesting a stable nano-alloy interphase.

Example 5

A sulfur/solid electrolyte/lithium cell was fabricated as follows. First, 300 mg of lithium thiophosphate was cold-pressed into a 1.128 cm diameter pellet using 10 tons of pressure. Then, 300 mg of a mixture of sulfur, carbon and lithium thiophosphate was spread atop the solid electrolyte pellet and the stack was pressed again with 6 tons of pressure. Finally, lithium foil was placed against the opposing side of the solid electrolyte, followed by copper foil to act as a current collector, and the stack was pressed at 4 tons of pressure.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:
1. A solid-state lithium battery, comprising in the following order:
   an anode comprising lithium metal or a lithium alloy with a metal;

an interphase region having a thickness of from 1 nm to 100 nm as a surface layer on and contacting the lithium metal or lithium alloy;

a solid-state electrolyte in direct contact with the interphase region; and a cathode;

wherein the interphase region consists of at least one of nanoparticles of an alloy of Li and an element M and nanoparticles of the element M uniformly arranged between the anode and the solid-state electrolyte and wherein the element M is selected from the group of elements consisting of Ag, Ca, Ga, Pb, Pd, Pt, Rh, Ru, Se, Sr, Te and Tl, and the solid-state electrolyte is a lithium thiophosphate selected from the group consisting of a lithium thiophosphate composite of formula (I), $Li_3PS_4$, $Li_7P_3S_{11}$ and $Li_{10}GeP_2S_{12}$:

$$xLi_2S \cdot yP_2S_5 \cdot (100-x-y)B \quad (I)$$

wherein B is a composite material selected from the group of materials including $Li_3N$, $P_2O_5$ $Li_2O$, $LiN_3$, $GeS_2$ or LiX wherein X is I, Cl or Br, each of x and y represent a mass % value of from 33.3% to 50% such that the total mass % of $Li_2S$, $P_2S_5$ and B is 100%.

2. The solid-state lithium battery according to claim 1, wherein the lithium thiophosphate comprises a lithium salt selected from the group of salts consisting of LiI, LiBr, LiCl, $Li_3N$, LiPON, $Li_3P$, $Li_2O$, $Li_3BO_3$, and $LiBH_4$.

3. The solid-state lithium battery according to claim 1, wherein the cathode comprises a lithium metal oxide selected from the group consisting of lithium cobalt oxide ($LiCoO_2$), lithium manganese oxide ($LiMn_2O_4$), lithium iron phosphate ($LiFePO_4$) and lithium nickel manganese cobalt oxide.

4. The solid-state lithium battery according to claim 1, wherein the cathode comprises elemental sulfur, selenium, tellurium or a mixture of two or more of these.

5. The solid-state lithium battery according to claim 1, wherein the anode is lithium metal, and the solid-state electrolyte is a material of formula (I).

6. The solid-state lithium battery according to claim 5, wherein the cathode comprises a lithium metal oxide selected from the group consisting of lithium cobalt oxide ($LiCoO_2$), lithium manganese oxide ($LiMn_2O_4$), lithium iron phosphate ($LiFePO_4$) and lithium nickel manganese cobalt oxide.

7. The solid-state lithium battery according to claim 5, wherein the cathode comprises elemental sulfur, selenium, tellurium or a mixture of two or more of these.

* * * * *